Figure 1:
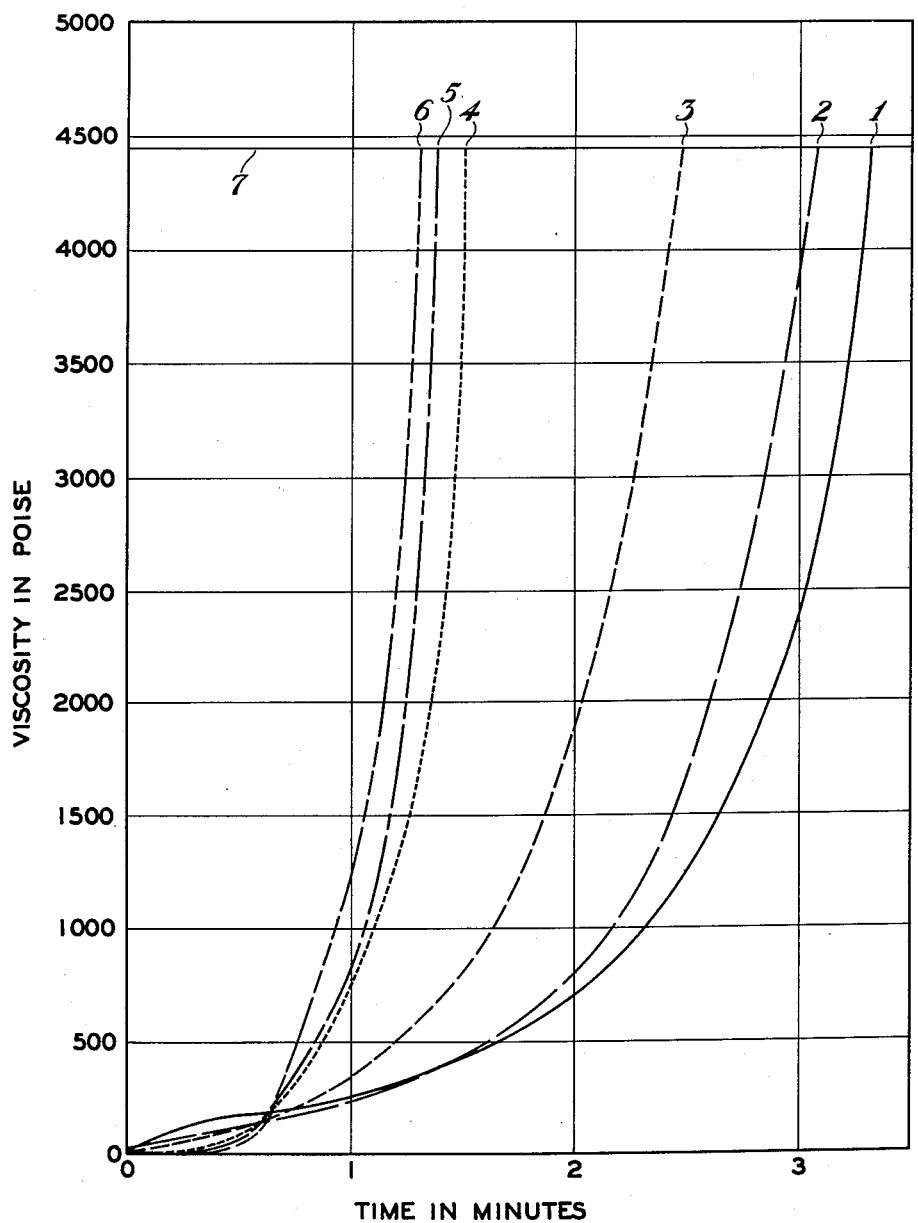

United States Patent Office 3,020,254
Patented Feb. 6, 1962

3,020,254
PHENOLIC RESIN AND MOLDING
COMPOSITION
Frank W. Less, Kenmore, Jay C. Searer, Snyder, and Eugene C. Roeck, Williamsville, N.Y., assignors to Hooker Chemical Corporation, Niagara Falls, N.Y., a corporation of New York
Filed Aug. 9, 1955, Ser. No. 527,314
13 Claims. (Cl. 260—38)

This invention relates to the making of thermosetting phenolic resins and to the production of molding compositions therefrom. More specifically, it refers to a new phenolic resin composition exhibiting low viscosity in the molten state, which will cure rapidly, and which may be used to produce rapid curing molding compositions exhibiting improved tensile strength in the completely cured state.

A great many uses have been found for phenolic resins. These uses may generally be divided into two main categories. One is the use of the resin itself, either in granulated form, pulverized form, in liquid form, or in solution as a cement. The second main category is the use of the phenolic resins as binders in conjunction with various inert fillers to form compositions that may be cured into infusible, insoluble, solid products. It is with the latter type of use that the present invention is mainly concerned. This category may still be further subdivided into two groups. In the first group there are those in which the phenolic resin comprises a major or at least a large proportion of the total composition. In this group the percentage of resin may vary from about 35 percent to about 90 percent of the weight of the total composition. The second group is made up of materials in which the resin binder constitutes a minor proportion of the total composition. Here the percentage of resin may vary from less than one percent to about 35 percent. Although the resin of the present invention may beneficially be used as a binder in both groups of molding compositions, it can be used to best advantage as a binder to form those compositions in which the resin constitutes a minor component. Among the various compositions falling into this group are those which may be used for shell molding, wood waste boards, Fiberglas mat, and grinding wheels. The shell molding composition comprises a major proportion of sand and a minor proportion of phenolic resin. The woodwaste type of composition comprises a major component of sawdust and a minor component of phenolic resins. The glass mat type of composition comprises a major proportion of Fiberglas and a minor proportion of phenolic resin. The grinding wheel composition comprises a major proportion of abrasive grit and a minor proportion of a phenolic resin binder.

The use of phenolic resins in the shell mold field is assuming an ever increasing importance in the industrial picture. This process was first disclosed in this country in FIAT final report 1168 entitled "The C Process of Making Molds and Cores for Foundry Use," by William W. McCulloch, Office of Technical Services, May 30, 1947, where there is described a process for making foundry molds by utilizing a mixture of sand and a thermosetting resin, specifically a mixture of phenolic resin and hexamethylenetetramine. More recently, a variation of the process has been developed which is based on the traditional method of blowing sand cores by means of an air pressure type of blowing machine. In this new method a mixture of sand and phenolic resin is placed in the charge chamber of a core-blowing machine, and the mix is injected under air pressure into an enclosed heated pattern. The mixture then fills the cavity under pressure and is later cured with the application of heat, so that the surfaces of the mold conform to the interior surfaces of the pattern cavities.

There are many advantages to be gained by utilizing the core blowing method in conjunction with the shell mold process. First, internal molds or cores can be produced as well as external molds. Second, shell molds having a uniform thickness may be produced since the sand mixture is blown into a confined or predetermined cavity. Third, both surfaces of the mold may be contoured. Fourth, the molds may be made hollow more readily. These and other improvements obtained through the use of the blowing method cannot be duplicated by the Croning process.

The use of the blowing process has necessitated the development of a moldable mixture wherein the resin binder is coated upon each discrete particle of sand. The physical admixtures which were developed for the Croning process were found inadequate since the resin tended to segregate during the blowing process and produce mold cores having nonuniform resin distribution. Several methods for accomplishing the coating of the phenolic resin upon the sand particles were developed. The resin composition of the present invention has been found especially useful for producing coated sand for use in the blowing process as well as in the Croning process, and its use therein will be described more particularly in the examples.

There are several features which are desirable in the low resin-content type composition. First, cost must be kept to a bare minimum. Consequently, the proportion of resin must necessarily be kept as low as possible, as the resin constitutes the most expensive component. In spite of this, the final molded product must have sufficient strength for the intended purpose. Therefore, it is desirable to have a resin which can be used in small amounts and which will still impart good strength to the finished molded product. Second, it is desirable that the resin binder be of such nature that it will cure rapidly.

In order to obtain a molded product having high strength with a minimum amount of binder, the resin which is to be used as the binder must exhibit high flow, that is, low viscosity in the molten state. During the molding period, the low viscosity resin can then easily encircle all the filler particles, and effect a strong bond among them. The effect of low viscosity in a resin appears more strikingly in the case of the molding compositions which have low resin content. There it is extremely important for the resin to distribute itself uniformly to the points of contact of the particles so that a limited amount of resin binder may be utilized most efficiently in securing a strong bond.

Several methods have been used in the past to impart low viscosity to a phenolic resin. One method is to incorporate a plasticizer. However, the presence of a plasticizer may render the finished molded product too flexible for many applications, decrease the cure speed, and cause difficulties due to the introduction of a volatile liquid. Another method is to use a liquid resin. However, liquid resins require a long curing period and are difficult to work with, and form dry workable molding compositions only with difficulty. Attempts to increase the rate of cure of the resin without decreasing the strength of the molded products have likewise met with little success. The most common accelerating agents used have been metallic oxides or hydroxides and various acids, such as sulfuric, hydrochloric, and oxalic. These materials have been found to accelerate the resin cure and have been used successfully with high resin content compositions. However, when these accelerators are used in low resin type compositions, the resulting products have less strength than products made from non-accelerated compositions. This reduction in strength is not of any real consequence in the high resin content materials since they already contain more than enough resin binder to off-set the loss of strength, but becomes a very serious problem in the case of compositions where it is desired to keep the resin content as low as possible. For instance in the case of a molding material such as a resin-sand mixture used for the shell mold process, the resin content must be kept to an absolute minimum to render its commercial use economically feasible. Consequently it is not practical to increase the resin content in order to overcome the loss in strength caused by the use of a traditional accelerator.

It is an object of the present invention to provide a phenolic resin exhibiting low viscosity in the molten state. It is a further object of this invention to provide a phenolic resin having a short curing period. It is a further object of this invention to provide a phenolic resin which will produce a molded article having high tensile strength when used as a binder in conjunction with fillers. It is still a further object of this invention to provide a phenolic resin, which when used in relatively small amounts together with filler material composed solid particles or fibres, will form a molding composition which can be cured rapidly to form a molded product having high tensile strength even when the resin is used in relatively small amounts. It is an additional object of this invention to provide a phenolic resin composition which is suitable for being coated about discrete particles of inert fillers. It is a further object to provide a moldable composition wherein the resin binder is coated about each particle of inert filler, and wherein the moldable composition may be cured in a short time to form infusible insoluble particles having excellent tensile strength. It is a further object to produce moldable compositions suitable for use in the shell mold industry in both the Croning and blowing processes. It is still a further object to provide a moldable composition suitable for producing grinding wheels and other abrasive objects. Further objects and advantages of this invention will appear more fully from the following description and from the graphs in the attached figure.

We have now found that by incorporating therein an aromatic monocarboxylic acid, a phenolic resin may be obtained, which, when utilized in relatively small amounts as a binder together with suitable fillers, will form moldable compositions having short curing periods, which may be cured to form molded products having excellent tensile strength.

We have also found that this phenolic resin composition is unusually well adapted to form molding compositions wherein each particle of inert filler is coated with resin binder. We have also found that this phenolic resin composition has excellent characteristics which make it ideal for use in making coated sand to be used in the shell mold art, and for making coated abrasive particles to be used in the grinding wheel and allied abrading arts. The aromatic monocarboxylic acid may be either unsubstituted or may contain substituents in the aromatic ring. The structure of the preferred additives may be represented by the formula:

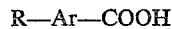

wherein R is a substituent selected from the group consisting of H, $CH_3$, and OH groups, and wherein Ar is radical selected from the group consisting of phenyl, phenyl-alkyl containing less than six carbon atoms in the alkyl group, and naphthyl radicals.

Among the compounds embraced within the above designation and which are included within the scope of this invention where Ar is a phenyl radical, are those such as benzoic acid, where R is hydrogen; salicylic acid, ortho-hydroxy benzoic acid, and p-hydroxy benzoic acid where R is an OH group; and o-, m-, and p-toluic acid where R is a $CH_3$ group. When Ar is a phenyl-alkyl or phenyl-alkenyl radical, representative compounds are phenyl-acetic acid, phenylpropionic acid, phenylbutyric acid, phenylvaleric acid, cinnamic acid, benzilic acid, hydrocinnamic acid, and others of similar structure containing either saturated or unsaturated aliphatic chains. Phenyl-alkyl or phenyl-alkenyl carboxylic acids may also be used wherein substituents such as $CH_3$ and OH groups are present in the benzene ring. Such acids are o-, m-, and p-methylphenylacetic acid, o-, m-, and p-hydroxyphenylacetic acid, and other $CH_3$ and OH ring substituted phenyl-alkyl or phenyl-alkenyl carboxylic acids up to and including five carbon atoms in the alkyl or alkenyl chain containing either saturated or unsaturated bonds. When Ar is a naphthyl radical, some representative compounds are alpha- and beta-naphthoic acid, naphthoic acid containing hydroxy or methyl substitution in the rings, and naphthyl-alkyl acids such as naphthyl acetic acid and substituted naphthyl acetic acids. Other aromatic monocarboxylic acids not represented by the above empirical formula may be used in the practice of this invention, such as ethyl or propyl benzoic acid, dialkyl benzoic acids such as dimethyl benzoic acid, dihydroxy benzoic acids, and phenyl-alkyl monocarboxylic acids containing 6 or more carbon atoms in the carbon chain. In such a case, however, it is necessary to use higher curing temperatures since in general, their melting points are higher than those compounds encompassed within the formula of the preferred group.

The resins used in the practice of the present invention are condensation products of a hydroxy aromatic compound and an aldehyde which has been reacted, neutralized and dehydrated in the presence of an acid catalyst to the point where the resin is a solid at room temperature. Either mono- or polyhydroxy aromatic compounds may be used. Among these are phenols, cresols, dihydroxy compounds such as resorcinol, and trihydroxy compounds such as phloroglucinol. Among the aldehydes which may be used are formaldehyde in any of its forms, acetaldehyde, furfural and others.

The phenolic resins used in this invention are commonly known in the art as two-step or two-stage resins. The first stage resin is prepared by condensing the phenol with the aldehyde in the ratio of one mole of the phenol to between about 0.5 and 0.85 mole of the aldehyde in the presence of an acid catalyst such as sulfuric acid. When the process has advanced to the desired stage, the acid catalyst is neutralized, and the water is evaporated under reduced pressure. The resin is then cooled to the solid state and further processed by such means as grinding until the desired size is attained. Sufficient hexamethylenetetramine is then added to provide sufficient methylene groups for cross-linking to render the mixture potentially thermosetting. Generally from 5 to 20 percent by weight of hexamethylenetetramine based on the weight of the resin is satisfactory.

The additive which is the subject of the present invention may be incorporated with the resin by any one of several methods. First, it may be added to the molten resin, after which the resin is cooled, crushed, mixed with hexamethylenetetramine and other ingredients, and then pulverized. The additive may be mixed with phenol before the phenol is condensed with formaldehyde. The resin is then processed in the normal manner, crushed, mixed with hexamethylenetetramine and then pulverized. A third method is to incorporate the additive with the solid resin, either in a lumped, crushed, or pulverized form, either before or after hexamethylenetetramine has been added to the resin, and then used in the normal manner. The additive may also be incorporated before, during, or after the time when the resin and hexamethylenetetramine, either separately or in admixtures, are added to the filler materials. It may also be introduced into a liquid resin which may subsequently be further cured and processed in the usual manner. The mixture as prepared by any of the above methods is then used for holding in the usual manner.

A number of desired results are obtained through the use of the additive which is the subject of the present invention. Foremost is the attainment of a resin, which, when used as a binder either in admixture or coated upon the filler particles, results in the production of molding compositions which exhibit very high tensile strength when molded and cured to the infusible, insoluble state. Another advantage resulting from the use of the additive is that the curing period of the resin is decreased considerably over that of a resin into which it has not been incorporated. A further advantage resides in the fact that the additive imparts a high degree of fluidity to the resin in its fused state, which property is maintained throughout a large part of the period of fusion, and almost until the moment when the resin begins to solidify to the cured state. This property enables the resin to flow freely during the fused state and distribute itself evenly among the contact junctions of the filler particles, producing a molded material which has a very high order of coherence. Another advantage attained through the use of the present additives is that less gassing occurs during the period in which the resin is cured. The gassing problem is very acute when materials are molded under atmospheric or low pressure conditions.

FIGURE 1 is a graph in which the coordinates are time and viscosity, showing the effects obtained when using the present additives together with a phenolic resin. Observations were made of the viscosities of the various resin mixtures during the curing process carried out experimentally at a temperature of 125 degrees centigrade. The data for the curves were obtained by means of measurements upon a mobilometer, as disclosed in U.S. Patent No. 2,574,715. This apparatus measures the viscosity of a resin at a constant temperature throughout the curing period until the gel stage is reached. A powdered two-step phenol formaldehyde resin was used for all the tests. This resin was made by condensing 1,000 grams of phenol, 10 grams of sulfuric acid, and 650 grams of an aqueous 37 percent solution by weight formaldehyde. After condensation was complete, the acid was neutralized, the resin dehydrated, cooled and ground. The ground resin was then mixed with 15 percent by weight of hexamethylenetetramine and pulverized.

Curve No. 1 represents the control and the data therefore was obtained by using the resin without any additive. From this curve it can be seen that the viscosity began to increase almost immediately, so that at the end of one-half minute it had reached a value of about 200 poises. The viscosity then continued to rise gradually and at one minute reached a value of 266 poises. At two minutes the value had reached 710 and at three minutes 2370. In order to reach 4440 poises, the gel point, denoted in FIGURE 1 by line 7, about 3.4 minutes were required.

Curve No. 2 was drawn from data obtained by using the resin described above together with one percent salicylic acid. The salicylic acid was physically mixed into the powdered mixture consisting of hexamethylenetetramine and powdered resin. Here it can be seen that at one-half minute the viscosity was 155 instead of 200 poises, indicating that the resin was more fluid in its molten state. The maximum value of 4440 poises was obtained at 3.1 minutes, indicating a faster cure.

Curve No. 3 was drawn from data obtained by using the resin together with 3 percent salicylic acid. Here also, the fluidity was higher during the first one-half minute. The maximum of 4440 poises was obtained at only 2.4 minutes, indicating an even faster cure.

Curve No. 4 was drawn from data obtained using a resin mixture containing 6 percent salicylic acid. Here it can be seen that the viscosity during the first one-half minute was very low, less than 110 poises. The maximum of 4440 poises was obtained in 1.5 minutes.

Curve No. 5 was drawn from data obtained in the same manner using 9 percent salicylic acid. Here the viscosity was also very low during the first one-half minute, and the 4440 poise point was reached at 1.4 minutes.

For curve No. 6 a 12 percent salicylic acid mixture was used. As can be seen, the viscosity during the first one-half minute was extremely low. This indicates that the resin had excellent flow properties. A cure to 4440 poises was obtained in only 1.3 minutes.

Similar results were obtained through the utilization of benzoic acid as the additive in the above tests.

In order to determine the effect of the additive upon the speed of cure at 165 degrees centigrade, the temperature normally used to cure phenolic resins and molding compositions, a series of tests using various additive concentrations was made on a hotplate. The following results were obtained:

TABLE I

| | Seconds |
|---|---|
| Standard resin without additive | 25 |
| Standard resin with 1% salicylic acid | 20 |
| Standard resin with 3% salicylic acid | 13 |
| Standard resin with 6% salicylic acid | 12 |
| Standard resin with 9% salicylic acid | 11 |
| Standard resin with 12% salicylic acid | 10 |

The results shown in the figure and in Table I demonstrate several of the advantages to be gained through the use of the additive of the present invention. First, they show that the incorporation of the additive increases the fluidity of the resin during the early part of the cure. This enables it to form a more homogeneous mixture with the filler, and results in imparting improved tensile strength properties to the final molded product. The second benefit obtained is a decided increase in the speed with which the phenolic resin binder or molding composition may be cured to the final insoluble, infusible state. Through the use of a fast-curing material the amount of time necessary for each molding operation may be shortened materially and the cost of the final finished product thus diminished.

The concentration of the additive is not critical. However, when used in concentrations below about 0.1 percent by weight of the phenolic resin, it does not sufficiently enhance the properties of the resin for most normal uses. Additionally, when the concentration of the additive is increased to the point where it is present in amounts larger than the phenolic resin, the effect of dilution upon the resin is sufficient to destroy its useful properties. The preferred range of working concentration is from about 0.5 percent to about 20 percent by weight of additive based on the weight of the phenolic resin.

The hexamethylenetetramine may be used in any amount which supplies sufficient methylene groups to render the first stage or novalac resin potentially thermosetting. The preferred range is from about 4 percent to about 20 percent by weight of the first stage resin.

Conventional mold lubricants may be used such as calcium stearate, carnauba wax, montan wax, etc. These materials act not only as a mold release agent, but also aid the final product in becoming non-packing. The lubricant to be used in amounts which effectively enable the mold to be released, may be in amounts from about 0.5 percent to about 10 percent by weight based on the phenolic resin. A preferred amount is 7.5 percent. It may be added with the resin mixture at the beginning of the mixing period, or added separately during the mixing period.

The following examples illustrate the present invention and the improvements resulting therefrom.

*Example 1*

(A) One thousand grams of phenol, 10 grams of sulfuric acid, and 60 grams of salicylic acid were mixed together in a reaction flask. The temperature of the mixture was raised to 100 degrees centigrade and 650 grams of aqueous 37 percent by weight formaldehyde were slowly added. After all the formaldehyde has been added, the mixture was refluxed for about 45 minutes. The sulfuric acid was then neutralized with 7.5 grams of calcium hydroxide in a slurry. The mixture was dehydrated until a melting point of about 65 degrees centigrade was attained. The brittle resin which formed was cooled and ground.

(B) To the resin produced in (A) 15 percent hexamethylenetetramine and 7 percent calcium stearate was added and the mixture was then pulverized. At this stage the material was suitable for use as a resinous binder together with fillers to form a molding composition.

In order to test the efficacy of this resin binder, a woodwaste molding compound was formed by mixing together 1,000 grams of wood sawdust with 150 grams of the mixture prepared above. Mixing was carried on in a ball mill for about 20 minutes. The moldable composition was then placed in a slab mold and heated at 162 degrees centigrade under 650 pounds per square inch pressure. A three-fourth inch molded board was thus produced. The length of time necessary to effect a satisfactory cure was six and one-half minutes.

*Example 2*

In this example the resin and molding material were prepared in the same manner as in Example 1, with the exception that the salicylic acid was omitted from the resin. The curing time at 162 degrees centigrade was nine and one-half minutes, indicating that 6 percent salicylic acid in the resin mix was able to reduce the curing time by three minutes.

*Example 3*

(A) A charge to a reaction flask of 1,000 grams of phenol and 10 grams of sulfuric acid was heated to a temperature of 100 degrees centigrade at which point 650 grams of aqueous 37 percent by weight formaldehyde were then slowly added. After the addition of the formaldehyde, the mixture was refluxed for about 40 to 45 minutes. The sulfuric acid was then neutralized with 7.5 grams of calcium hydroxide in a slurry. The mixture was dehydrated under reduced pressure in the usual manner. The resin was cooled and ground into small particles.

(B) To the resin produced above in (A) 15 percent hexamethylenetetramine by weight based on the resin, was added, mixed and pulverized. Two hundred ninety-two grams of the mixture prepared above were then placed together with 25 pounds of Number 505 Manley sand in a Simpson 24 inch laboratory muller. The materials were mixed together for several minutes until a uniformly dispersed mixture was obtained.

This resin and sand mixture was then utilized in the shell mold process which involves dumping a mixture of sand and phenolic resin powder over a heated pattern plate to form a thin shell, as more fully disclosed in FIAT Final Report, No. 1163, entitled "The C Process of Making Molds and Cores for Foundry Use" by William W. McCulloch, Office of Technical Services, May 30, 1947. Specimens of the shell molds so prepared were cured in an oven at a temperature of 450 degrees Fahrenheit for four minutes, and tested for tensile strength on a Dietert tensilometer. The pieces tested had a tensile strength of about 400 pounds per square inch.

*Example 4*

Two hundred ninety-two grams of the resin prepared above in Example 3(A) were then mixed with 20 grams of salicylic acid and 15 percent hexamethylenetetramine by weight based on the resin, then mixed, and pulverized. This mixture was then placed together with 25 pounds of Number 505 Manley sand in a Simpson 24 inch laboratory muller and mixed together for several minutes. This mixture was then treated according to the process disclosed and claimed in our copending application S.N. 527,408 filed of even date herewith, now U.S. Patent 2,965,514, which discloses a process for effecting coating of resin about filler particles such as sand for the shell mold process. According to the coating process disclosed therein, a mixture containing 60 grams of ethyl alcohol and 20 grams of water was added to the mixture produced above, and the mixing process continued for about 14 to 15 minutes until the sand was free of lumps and there were no segregated resin particles in the sand mixture, indicating that the coating process was complete. Test pieces were then made from this material and cured in the same manner as described above, and then tested. The tensile strength obtained was about 450 pounds per square inch.

In order to demonstrate the effectiveness of some of the various materials which may be used as additives in the present invention, a number of the species falling within the disclosure of the present invention were substituted for salicylic acid in a manner after the foregoing examples. In each of the examples of this invention shown in Table II below, 272 grams of a powdered two-step phenolic resin (produced by the methods shown in Example 3(A)) and containing 10 percent hexamethylenetetramine, 25 pounds of Manley Number 505 sand, and 20 grams of the particular additive were mixed together according to the method described in Example 3(B). After several minutes of mixing 100 grams of a mixture of three parts of ethyl alcohol and one part of water were added. Mixing was then continued for an additional 15 minutes until the sand was free of lumps. Test pieces were than made from each material and tested for tensile strength.

TABLE II

| | Additive | Tensile Strength in lbs./sq. inch |
|---|---|---|
| Example 5 | Salicylic acid | 425 |
| Example 6 | Benzoic acid | 444 |
| Example 7 | Cinnamic acid | 456 |
| Example 8 | Phenylacetic acid | 473 |
| Example 9 | 1-Naphthoic acid | 393 |
| Example 10 | p-Toluic acid | 353 |
| Example 11 | Benzilic acid | 348 |
| Example 12 | Hydrocinnamic acid | 450 |
| Example 13 | No additive | 250 |

Although in the above examples the additives were incorporated by mixing with the powdered novolac resin and hexamethylenetetramine, they may also be added to the phenol before it is condensed with formaldehyde, in which case the novolac resin will already contain the additive. The additive may also be added to the molten novolac resin after the resin has been condensed and dehydrated. These methods are shown in the following examples.

*Example 14*

(A) A charge of 1,000 grams phenol, 10 grams sulfuric acid and 100 grams crude salicylic acid was placed in a reaction flask. The temperature of the mixture was raised to 100 degrees centigrade and 650 grams of aqueous 37 percent by weight formaldehyde were slowly added. After the formaldehyde had been completely added the mixture was refluxed for an additional 45 minutes. The sulfuric acid was then neutralized with 8.7 grams lime in a slurry containing 20 grams water. The resin was then dehydrated and cooled. The brittle resin which formed upon cooling was ground, mixed with 15 percent by weight of hexamethylenetetramine and seven percent by weight of calcium stearate, and the mixture pulverized.

(B) Two and one-half pounds of the resin produced above in (A) were then placed together with 100 pounds of Wedron No. 60 foundry sand in a muller and mixed together for several minutes. While mixing continued a solution containing 300 grams ethyl alcohol and 100 grams water was added in a stream. Mixing was continued for about 20 minutes, at which time the mixture was almost free of lumps. This mixture was then put through a screen in order to break up any small lumps remaining and to provide aeration. The material was non-tacky, free-flowing and contained no descrete resin particles. Test pieces were then made from this material and tested on a Dietert Tensilometer as described above in Example 3(B). The tensile strength obtained was 517 pounds per square inch.

*Example 15*

A resin was prepared according to the method of Example 3(A). However, while the resin was still in the molten stage, 20 grams of salicylic acid were added to a 292 gram sample of resin. The molten resin was stirred until the salicylic acid had completely dissolved and then was cooled, ground and compounded with 15 percent hexamethylenetetramine. The resin was then coated in the same proportions and in the same manner described above in Example 4. Test pieces prepared from this material exhibited a tensile strength of about 450 pounds per square inch.

*Example 16*

This example illustrates the preparation of a coated foundry sand according to the present invention by the coating method disclosed in our copending application, S.N. 454,701, filed September 8, 1954, now United States Patent 2,912,406. According to this method three hundred pounds of Wedron No. 60 sand were placed in a Beardsley-Piper speed muller. The muller was turned on and 1.35 pounds of dibutylphthalate were slowly added. The muller was stopped after five minutes at which point the phenolic composition such as prepared above in Example 1(B) was added to the muller. The muller was started again and was allowed to run for an additional 15 minutes. The resulting mixture when screened appeared to be non-tacky, free-flowing, and exhibited no tendency to form dust. Samples of the above when tested exhibited a tensile strength of about 475 pounds per square inch.

*Example 17*

In order to test the effectiveness of the molding composition of the present invention for use in high speed equipment where very short curing periods are essential, the mixture prepared above in Example 1 (B) was used in an automatic shell mold machine and compared with a similar composition which did not contain salicylic acid. At a temperature of 400 degrees Fahrenheit the composition containing salicylic acid cured in 15 seconds, while the composition which did not contain salicylic acid required 60 seconds to achieve a comparable tensile strength.

In order to test the effectiveness of the phenolic resin binder of the present invention for use in making grinding wheels, a mixture was prepared by methods similar to those given above. In each of the examples given in Table III, the abrasive grit was mixed with the resin binder in a Simpson muller for about one minute. Then in order to achieve a uniform resin binder coating about each abrasive grain particle, a mixture of three parts ethyl alcohol and one part water was added and mixed for about three minutes. When the mixture became tacky and lumpy, it was removed from the mixer and air dried for four to five minutes. It was then returned to the muller and mixing was carried on for an additional five minutes until the grains were free-flowing. The resin coated grit was then screened to remove or break-up any remaining lumps.

Test pieces were then prepared by molding the material so prepared on the test pattern at a temperature of 375 degrees Fahrenheit, and then curing for four minutes at 450 degrees Fahrenheit in an oven.

Table III below shows the results obtained by using the additive of the present invention with various types of abrasive grit. In every example the resin binder had the following composition: thirteen parts salicylic acid, 100 parts two-step resin such as described above in Example 3(A), 10 parts hexamethylenetetramine, one part magnesol, which consists of synthetic anhydrous magnesium silicate, and 7.5 parts calcium stearate.

TABLE III

| | Grit | Resin Binder, lbs. | Alcohol, grams | Water, grams | Tensile Strength, p.s.i. |
|---|---|---|---|---|---|
| Example 18 | Lionite 120 (Aluminum oxide) 29.5 pounds. | 1.18 | 75 | 25 | 550 |
| Example 19 | Carborundum 36WPH3 (Aluminum oxide) 29.5 pounds. | 1.78 | 75 | 25 | 250 |
| Example 20 | Carborundum 120SGM (Silicon Carbide) 29.5 pounds. | 1.78 | 100 | 33 | 980 |

Although the present invention has been described with a certain degree of particularity, it is understood that the present disclosure has been made only by way of example and that numerous changes in details of composition and procedure may be resorted to without departing from the spirit and the scope of the invention as hereinafter claimed.

We claim:

1. A moldable composition comprising as a major component solid discrete inert filler particles, and as a minor component, a thermosetting phenolic resin composition in an amount from about one percent to about thirty-five percent by weight of the total composition which comprises (A) the solid comminuted reaction product of formaldehyde with phenol in the ratio of between about 0.5 and about 0.85 mol formaldehyde per mol of phenol, (B) hexamethylenetetramine in an amount between about four percent and about twenty percent by weight of said solid reaction product (A), and (C) an aromatic monocarboxylic acid which imparts a high degree of fluidity to the resin in its fused state in an amount ranging between about 0.5 and about twenty percent by weight of said solid reaction product (A), wherein said aromatic monocarboxylic acid is selected from the group consisting of ethyl benzoic acid, propyl benzoic acid, dialkyl benzoic acids, dihydroxy benzoic acids, and an aromatic monocarboxylic acid which has the formula: R—Ar—COOH wherein R is a substitutent selected from the group consisting of H, $CH_3$, and OH groups, and wherein Ar is a radical selected from the group consisting of phenyl, phenyl-alkyl, phenyl-alkenyl containing less than six carbon atoms in the alkenyl group, and naphthyl.

2. A moldable composition comprising solid discrete inert filler particles wherein said filler particles are coated with a thermosetting phenolic resin composition in an amount from about one percent to about thirty-five percent by weight of the total composition which comprises (A) the solid reaction product of formaldehyde with phenol in the ratio of between about 0.5 and about 0.85 mol formaldehyde per mol of phenol, (B) hexamethylenetetramine in an amount between about four percent and about twenty percent by weight of said solid reaction product (A), and (C) an aromatic monocarboxylic acid which imparts a high degree of fluidity to the resin in its fused state in an amount ranging between about 0.5 and twenty percent by weight of said solid reaction product (A), wherein said aromatic monocarboxylic acid is selected from the group consisting of ethyl benzoic acid, propyl benzoic acid, dialkyl benzoic acids, dihydroxy benzoic acids, and an aromatic monocarboxylic acid which has the formula: R—Ar—COOH wherein R is a substitutent selected from the group consisting of H, $CH_3$ and OH groups, and wherein Ar is a radical selected from the group consisting of phenyl, phenyl-alkyl, phenyl-alkenyl containing less than six carbon atoms in the alkenyl group, and naphthyl.

3. A moldable composition according to claim 2 wherein the aromatic monocarboxylic acid is salicylic acid.

4. A moldable composition according to claim 2 wherein the aromatic monocarboxylic acid is benzoic acid.

5. A moldable composition according to claim 2 wherein the aromatic monocarboxylic acid is cinnamic acid.

6. A moldable composition according to claim 2 wherein the aromatic monocarboxylic acid is phenylacetic acid.

7. A moldable composition according to claim 2 wherein the aromatic monocarboxylic acid is p-toluic acid.

8. A moldable composition according to claim 2 wherein the inert filler particles are sand grains.

9. A moldable composition according to claim 2 wherein the inert filler particles are abrasive grit.

10. A moldable composition according to claim 2 wherein the aromatic monocarboxylic acid is salicylic acid and the inert filler particles are sand grains.

11. A process for preparing a moldable composition which comprises admixing formaldehyde, phenol, and an aromatic monocarboxylic acid, wherein the molar ratio of formaldehyde to phenol is in the range between about 0.5 and about 0.85 mol of formaldehyde per mol of phenol, wherein the amount of the aromatic monocarboxylic acid ranges from between about 0.5 and about twenty percent by weight of the reaction mixture, and wherein said aromatic monocarboxylic acid is selected from the group consisting of ethyl benzoic acid, propyl benzoic acid, dialkyl benzoic acids, dihydroxy benzoic acids, and an aromatic monocarboxylic acid which has the formula: R—Ar—COOH wherein R is a substituent selected from the group consisting of H, $CH_3$, and OH groups, and wherein Ar is a radical selected from the group consisting of phenyl, phenyl-alkyl, phenyl-alkenyl containing less than six carbon atoms in the alkenyl group, and naphthyl, comminuting the resulting reaction product, admixing hexamethylenetetramine with said comminuted reaction product in a proportion equivalent to between about four and about twenty percent by weight of said reaction product, comminuting the resulting mixture to yield a thermosetting phenolic resin composition, and coating solid discrete inert filler particles with said thermosetting phenolic resin composition to yield a moldable composition, wherein the proportion of said resin is between about one and about thirty-five percent by weight of said moldable composition.

12. The process of claim 11 wherein said aromatic monocarboxylic acid is salicylic acid.

13. The process of claim 11 wherein said aromatic monocarboxylic acid is salicylic acid and said solid discrete inert filler particles are sand grains.

References Cited in the file of this patent

UNITED STATES PATENTS

| | | |
|---|---|---|
| 1,020,594 | Aylsworth | Mar. 19, 1912 |
| 1,102,634 | Aylsworth | July 7, 1914 |
| 1,989,802 | Hester | Feb. 5, 1935 |
| 2,124,532 | Schmitz | July 26, 1938 |
| 2,411,557 | Schur | Nov. 26, 1946 |
| 2,524,986 | McBride | Oct. 10, 1950 |
| 2,608,546 | Jackson | Aug. 26, 1952 |
| 2,706,163 | Fitko | Apr. 12, 1955 |
| 2,706,188 | Fitko et al. | Apr. 12, 1955 |
| 2,736,718 | Webber | Feb. 28, 1956 |
| 2,856,381 | McNaughton et al. | Oct. 14, 1958 |
| 2,888,418 | Albanese et al. | May 26, 1959 |

FOREIGN PATENTS

| | | |
|---|---|---|
| 160,258 | Great Britain | Mar. 15, 1921 |